United States Patent [19]
Brugger et al.

[11] 3,863,050
[45] Jan. 28, 1975

[54] AUTOMATIC CREDIT CARD VALIDATING DEVICE

[76] Inventors: Max T. Brugger; Antoinette M. Brugger, both of S. Pine Ave., Milwaukee, Wis. 53207

[22] Filed: Jan. 7, 1974

[21] Appl. No.: 431,351

[52] U.S. Cl............... 235/61.7 B, 235/61.11 C
[51] Int. Cl............... G06k 5/00, G06k 7/04
[58] Field of Search ............... 235/61.7 B, 61.11 C; 340/149 A

[56] References Cited
UNITED STATES PATENTS

| | | | |
|---|---|---|---|
| 3,581,063 | 5/1971 | Levasseur | 235/61.7 B |
| 3,602,139 | 8/1971 | Allport | 235/61.7 B |
| 3,611,292 | 10/1971 | Brown et al. | 235/61.7 B |
| 3,624,357 | 11/1971 | Wright | 235/61.7 B |
| 3,665,161 | 5/1972 | Oberhart | 235/61.7 B |

*Primary Examiner*—Daryl W. Cook

[57] ABSTRACT

A device intended for use by small businessmen and the like for automatically indicating whether a credit card is valid or invalid at the time of imprinting the credit card information on a conventional credit charge slip wherein the credit card is placed in the device and as the credit card information is imprinted onto the credit charge slip the same information is simultaneously read by the device from whence such information is compared with stored credit card information from a memory bank in the device with the resultant output signal energizing a valid light when the credit card is valid or energizing a void light when the credit card is invalid. The memory bank information is provided with a key system for simple constant updating by the businessman as to inserting into the memory bank those numbers of invalid credit cards as supplied by credit card companies and the like thus assuring the businessman that all credit cards are automatically checked for validity against the most possible updated credit card information to assure no invalid or voided credit cards from being used in the purchasing of merchandise from the businessman.

5 Claims, 9 Drawing Figures

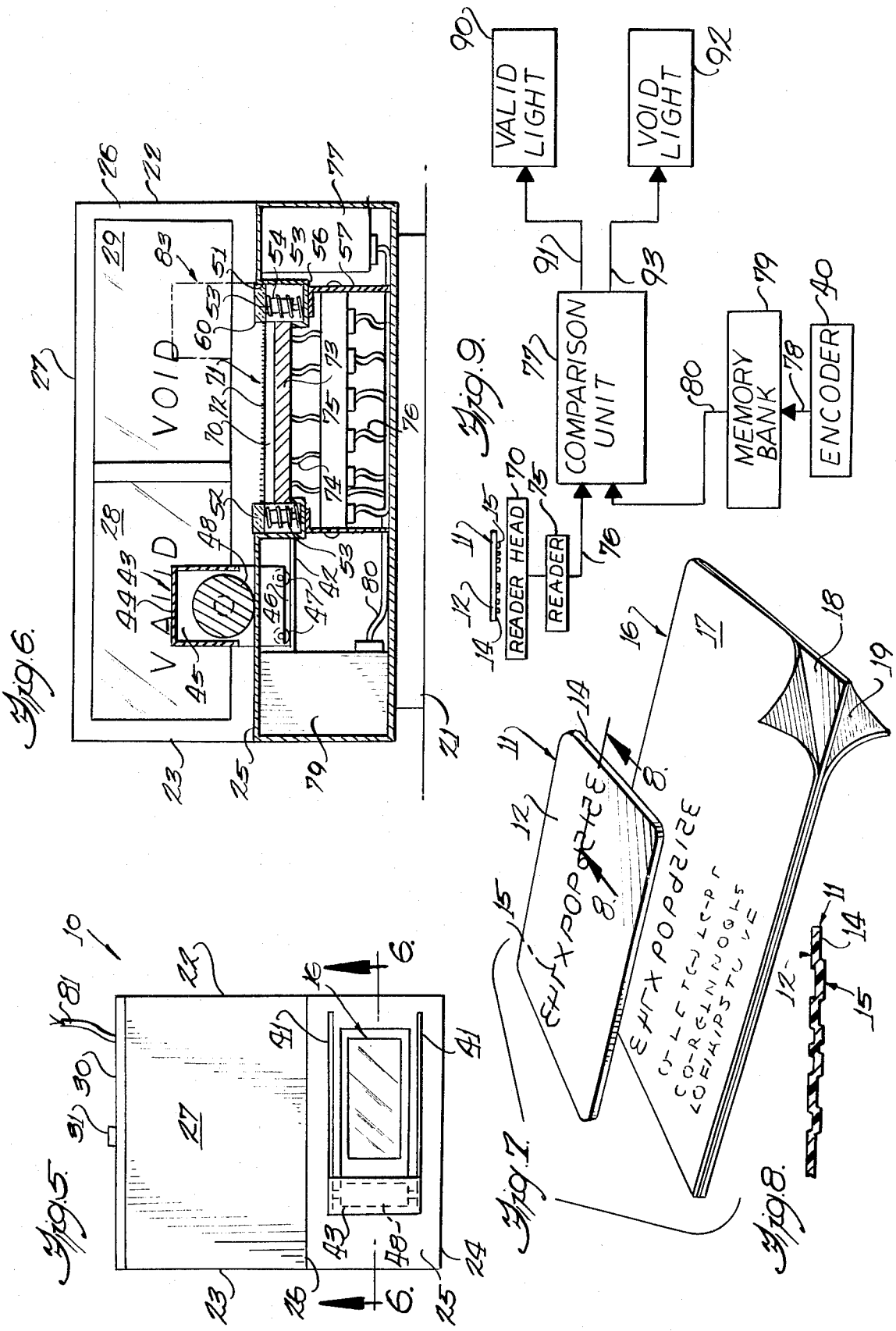

AUTOMATIC CREDIT CARD VALIDATING DEVICE

BACKGROUND OF THE INVENTION

1. Field of the Invention

The present invention relates to an automatic credit card validating device for automatically reading the identifying information encoded on credit cards and comparing the same with a memory bank of void and invalid credit cards and then automatically indicating whether the credit card is valid or void, this all taking place automatically upon the imprinting of the credit card information on the credit charge slip at the time of purchasing merchandise and the like.

2. Description of the Prior Art

In view of the great number of different credit cards being accepted by smaller businessmen and the responsibility as to checking each credit card against the most current printed lists of voild or invalid or stolen credit cards so that the businessman does not accept such a card which would result in the businessman suffering a financial loss in the amount of the merchandise purchased with such a void card, this task has become excessively complicated and time consuming while resulting in poor customer relations for those customers who must be kept waiting while the validity of their credit card is checked against such lists or are checked by telephone to a master computer complex. The small businessman thus suffers many problems in the constant effort to avoid taking any but valid credit cards while the customer constantly insists on faster and better service and does not wish to be kept waiting while the businessman checks on the validity of the credit card.

It would thus be desirable to provide some type of device for determining validity of credit cards in a rapid and expedient manner, and as such the prior art does show encoded credit cards which have been used in different types of verification and related systems, such as for automatic ticket gates and the like. For example, credit cards have been encoded by means for such arrangements as incoporation in the cards of components having a predetermined resistance or capacitance characteristic, and in addition, magnetically encoded cards have been utilized. While these arrangements may be fine for large business establishments or other organizations who can afford the costly equipment required for the use of such cards, these same arrangements suffer from a number of deficiencies which render them totally undesirable for credit verification purposes for the small businessman. Not the least of these deficiencies is the prohibitive expense in using such relatively expensive credit cards. In addition, the read-Out mechanisms and devices needed to read such complex credit cards are quite complex in themselves and thus prone to mechanical failure after repeated use. Thus, such complex read-out equipment and associated complex credit cards do not readily lend themselves to use by the small businessman who cannot afford the expense of such equipment and the high cost of regular maintenance thereof.

SUMMARY OF THE INVENTION

The present invention recognizes the plight of the small businessman in having to avoid accepting void credit cards for the purchase of merchandise, and after considering the deficiencies and disadvantages of presently available complex and expensive credit card examining devices, the present invention provides a novel solution thereto in the form of a credit card validating device for use with conventionally embossed plastic credit cards or the like in a manner to simultaneously check the validity thereof while the charge slip is being imprinted with the information carried on the card in a manner such that when a customer presents a credit card at the time of purchasing merchandise, the credit card is placed in the device along with a charge slip and the information of the credit card imprinted on the charge slip along with being simultaneously read by suitable reading mechanisms and compared with a memory storage bank of void credit cards to thus instantly indicate to the clerk or sales person whether the credit card is valid or void. In this way the customer is not kept waiting while lengthy printed lists are checked to determine the validity of such credit card, or while timely telephone calls are being made to check the validity of the credit card.

A further provision of the present invention provides for the constant updating of the memory storage bank of the device by means of simple adding machine type key arrangement such that the number of a void credit card received by the small businessman on printed lists or the like form credit card companies can be rapidly punched into the memory bank without requiring any special skills or expertise so that the validating device is constantly updated to assure the most current possible indication of all void credit cards thus protecting the businessman against inadvertently accepting a credit card which the businessman has already been advised of as being void such that the businessman need have no fears of accepting a void credit card and thus having to suffer the personal financial loss for the merchandise purchased with the same.

It is a feature of the present invention to provide a relatively simple and inexpensive automatic credit card validating device for reading out desired information from an encoded credit card and indicating whether such card is valid or void without incurring any delay or inconvenience to a customer.

A further feature of the present invention provides an automatic credit card validating device which is of an inexpensive, simple and durable construction and which is adapted to simultaneously read information from a credit card to determine its validity at the same time the information of the credit card is being imprinted onto a charge slip.

Still a further feature of the present invention provides an automatic credit card validating device which, as compared to the overly complex devices employing magnetic verification or electrical resistance or capacitance characteristic verification, is relatively inexpensive to manufacture due to its simplicity of construction.

Yet still a further feature of the present invention provides an automatic credit card validating device which is easy to use and reliable and efficient in operation and provides for rapid processing of customers at the time of purchasing the merchandise.

Yet still a further feature of the present invention provides an automatic credit card validating device specifically intended for use by small businessman as being inexpensive to purchase and maintain so as to be a highly desirable device in view of its protective abilities as to protecting the businessman from inadvertently accepting a void credit card and thus suffering the financial loss involved with such a transaction.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 5 is a top plan view of the automatic credit card validating device;

FIG. 6 is an enlarged cross-sectional view taken along Line 6—6 of FIG. 5;

FIG. 7 is an exploded perspective view of a charge slip and a credit card of the type intended for use with the credit card validating device of the present invention;

FIG. 8 is a cross-sectional view taken along Line 8—8 of FIG. 7; and

FIG. 9 is a schematic representation of the validating system of the device.

DESCRIPTION OF THE PREFERRED EMBODIMENT

Figure 1:
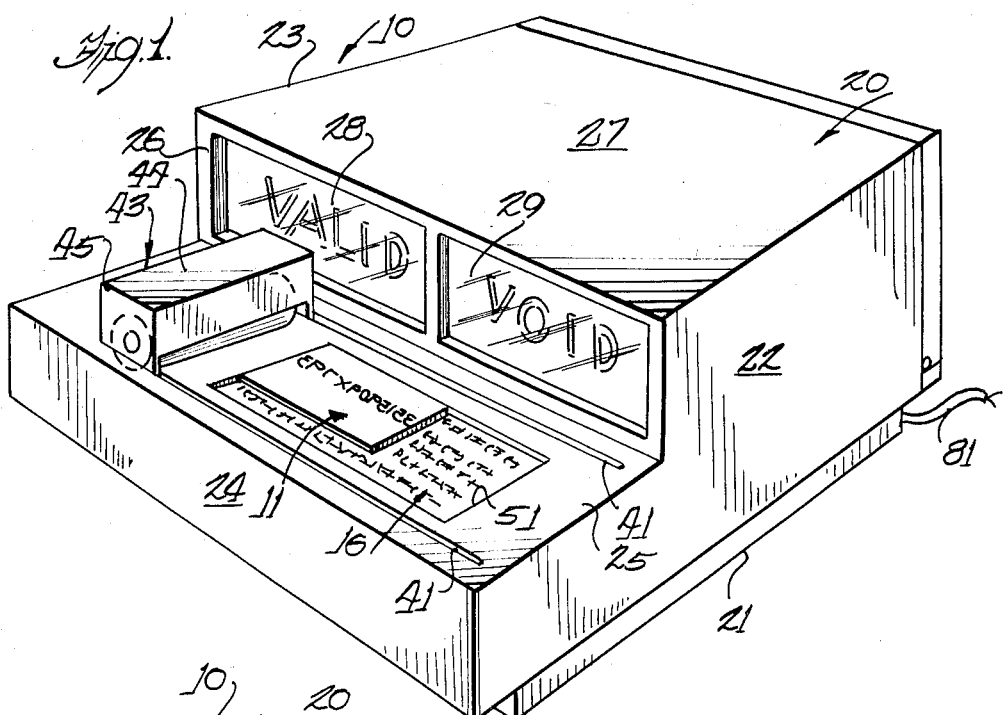
FIG. 1 is a perspective view illustrating the automatic credit card validating device of the present invention with a credit card and charge slip inserted in place thereon.

Referring now to the drawings in detail there is illustrated a preferred form of an automatic credit card validating device constructed in accordance with the principles of the present invention and designated generally in its entirety by the reference numeral 10 and which is intended for use with a substantially flat rectangularly shaped credit card 11 having a flat back surface 12 and a front surface 14 having a plurality of embossments 15 projecting outwardly from the face surface of the credit card in the form of encoding information, such as a credit card number, credit card letters, a combination of numbers and letters, or the like.

Figures 2, 3:
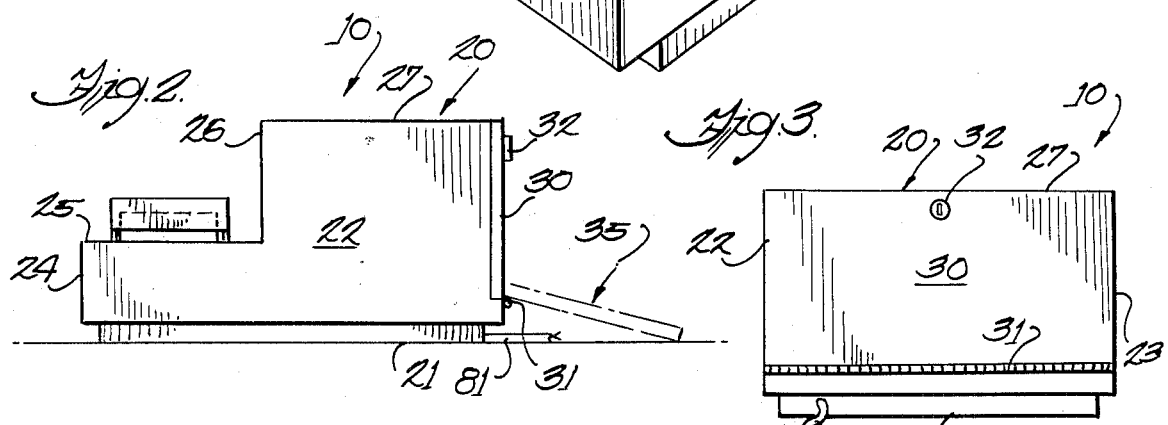
FIG. 2 is a side elevational view of the automatic credit card validating device.
FIG. 3 is a back elevational view of the automatic credit card validating device.

The device 10 includes a housing 20 having a base 21, opposed L-shaped sides 22 and 23, a front side 24, a platform 25 for the placing of the credit card 11 and charge slip 16 thereon as will be later described, a vertical wall 26 interconnecting the platform with the housing top surface 27 and provided with a pair of side-by-side viewing window areas 28 and 29 which are imprinted with the words VALID and VOID respectively, and a back panel 30 connected along its bottom edge by a piano type hinge 31 to the base 21 and swingable thereabout to a position closing the housing and to a position opening the back of the housing, the panel adapted to be locked in its closed position by a key lock 32 in a manner to prevent unauthorized entry into the housing 20. As seen in FIG. 2 the panel 30 pivots about hinge 31 to the open position as designated in phantom line configuration and indicated generally by reference numeral 35, this open position permitting access to the interior of the housing 20 wherein there is disposed a keyboard arrangement 40 defining an encoder and which is mounted by its frame 41' to structural members 42' of the housing.

Figure 4:
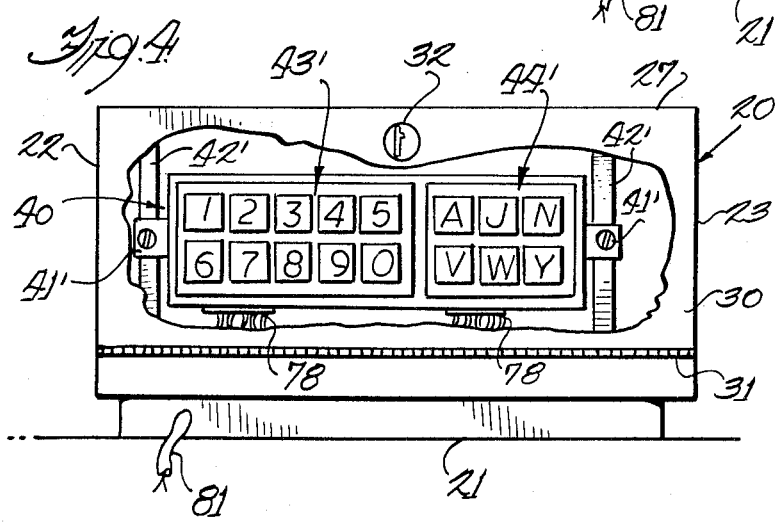
FIG. 4 is an enlarged back elevational view similar to FIG. 3 but with the back panel partially broken away to illustrate the interior details thereof as to the keys for punching void credit card numbers into the memory bank unit of the device.

The encoder 40 is of an electrical adding machine or calculator type including a plurality of push-buttons 43' designating numerals from 0 to 9 inclusive, and also having a second keyboard of push-buttons 44' associated therewith and having different letters of the alphabet imprinted thereon such as seen in FIG. 4. In this regard it is to be appreciated that the letters of the alphabet on keyboard 44' may be selected to suit any particular credit card system with which the device of the present invention is to be used, and that such keyboard while shown with only six keys thereon may be provided with more or less keys within the scope of the present invention. Similarly, keyboard 43' may also be provided with more or less keys having the same or different numerals thereon for use with different types of credit cards for different credit card systems, this being as envisioned within the scope of the present invention.

The platform 25 is provided with a pair of parallel spaced apart longitudinal guide slots 41 extending substantially between sides 22 and 23 with there being a track 42 disposed beneath each guide slot and spaced vertically downwardly therefrom. An inverted U-shaped bracket 43 having a horizontal base portion 44 extending between slots 41 and having depending vertically Projecting leg portions 45 extending downwardly therefrom an received in associated ones of said slots 41 for guided reciprocal movement therealong is provided. Each leg portion 45 has a terminal bottom edge 46 which is normally spaced a slight distance upwardly from associated track 42 with each edge provided with pairs of rollers 47 adapted to engage track 42 in a manner as will be later described. Extending between leg portions 45 is a cylindrical impression roller 48 mounted for rotation about its axis and adapted to roll along the top surface of platform 25 when rollers 47 engage tracks 42, the roller being of a resilient material, such as rubber, to permit slight deformation of its circumferal surface in engagement with the platform such that an individual pressing down on the bracket 43 can provide firm pressure of the roller against the platform.

A rectangularly shaped elongated slot 51 is provided centrally of slots 41 and is of a size and configuration adapted to receive in a positioning manner therein the charge slip 16 which is comprised of a top sheet 17 defining a customer's copy, a sheet of carbon paper 18 disposed beneath the customer's copy sheet 17, and a sheet 19 disposed beneath the carbon paper and forming the store copy of the charge slip. The charge slip is placed in the slot 16 with the sheet 17 facing upwardly.

Disposed in the slot 51 is platform member 52 which is resliently supported for movement in a vertical direction relative to platform 25 by coiled springs 53 guided for movement about a hollow cylindrical boss 54 secured at one end to the platform member and depending downwardly therefrom to receive guide pin 55 axially therein with the guide pin being secured to a flange member 56 of the housing 20, the flange member preferably supported by housing support members 57. In this manner as roller 48 rolls over platform member 52 the same is depressed vertically downwardly for purposes as will be later described. In addition there is provided in platform member 52 a rectangular slot area 60 of a size and configuration adapted to receive credit card 11 in an overlying position relative thereto with there being disposed vertically downwardly of the plane of the slot 60 a reader head assembly 70 having a multiplicity of embossment detection pins 71 on the top surface 72 thereof with the reader head being mounted on horizontal support member 73 extending between housing brackets 56. The embossment detection pins 71 are electrical elements adapted to detect and read the embossments 15 on credit card 11 when the same is disposed thereover and then pressed thereonto by impression roller 48.

The reader head 70 is connected by suitable electrical wiring 74 to a reader 75 which translates the readings from the embossment detection pins 71 into suitable electrical signals from whence they are directed through suitable electrical wires 76 to a solid-state comparison unit 77 for purposes as will be later described.

The encoder 40 is connected by suitable electrical wires 78 to a solid-state memory bank 79 which in turn is connected by suitable electrical wiring 80 to the comparison unit 77. It is to be understood that the electrical energy for operating the device 10 of the present invention is provided in the conventional manner by an electrical cord 81 projecting out of the back end of platform 21 and adapted to be plugged into a suitable source of electrical energy such as provided by a conventional receptacle and the like.

In operation, the charge slip 16 is placed in slot 51 with the credit card 11 being placed in an upside down manner on top of the charge slip and overlying the slot 60 of platform member 52 such that the embossments of the credit card are facing downward in a manner to engage the charge slip, after which an individual grasps bracket 43 and traverses the same across platform 25 from its initial position as shown in FIG. 6 to a final position as shown in dotted lines in FIG. 6 and indicated by reference numeral 83, this movement of the impression roller 48 effecting downward pressure on the credit card and charge slip thus depressing platform member 52 downwardly of spring 53 to cause the embossments of the credit card to imprint the charge slip while simultaneously having the depressions of the charge slip made by such embossments engage respective ones of the embossment detection pins 71 such that the reader head 70 is provided with input signals corresponding to the reading of the embossments. This signal is transmitted to the reader assembly 75 where the resultant signal is then transmitted to the comparison unit 77. The comparison unit 77 compares the signal from the reader with signals of the memory bank 79 wherein such memory bank contains a listing of all void credit card numbers, and if comparison in such unit with the memory bank indicates no void corresponding number than the credit card is valid and the comparison unit completes an appropriate circuit to energize a valid light signal 90 through suitable wiring 91 in a manner to illuminate the VALID viewing area 28, this instantaneously indicating to the user of the device that the credit card is valid. On the other hand, should the comparison unit 77 be able to compare the input signal from the reader 75 with a similar signal from the memory bank 79, this being the case then the credit card number being read has been entered in the memory bank as being void, then the comparison unit completes an appropriate circuit which energizes a void light 92 through suitable electrical wiring 93 thus illuminating the VOID viewing area 29 of the device to instantly indicate to the user that the credit card is void and is not to be honored.

It is to be appreciated that the encoder 40 is simple to operate in a rapid and efficient manner such that daily lists of void credit cards may be rapidly entered into the memory bank 79 by punch buttons 43' and 44' of the encoder such that, once entered, the small businessman has fully performed his agreement with the credit card companies which place the burden on the businessman as to accepting any void credit cards after having been advised that such credit card is void then the businessman must bear the financial loss incurred thereby. The present invention thus provides a device which prevents any inadvertent acceptance of void credit cards by a small businessman, the device being simple and efficient in operation, and each credit card having to be mandatorily checked by sales clerks and personnel as the checking process is automatic upon the imprinting of a sales charge slip so that personnel cannot inadvertently forget to check every credit card as to the validity of the same.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. An automatic credit card validating device adapted for use with credit cards and the like having encoding embossments projecting from a face surface thereof, the device comprising:

a housing including at least one substantially horizontal surface thereon;

an elongated rectangularly shaped slot defined in said surface and being of a size and configuration adapted to receive a substantially flat charge slip therein;

a platform resiliently supported for vertical reciprocal movement in said slot and adapted to restingly receive said charge slip thereon;

a rectangularly shaped aperture disposed in said platform and being of a size and configuration corresponding to said charge card such that when said charge card is rested on said charge slip resting on said platform said charge card will overlie said aperture;

means associated with said surface and adapted to depress said charge card against said charge slip to imprint said charge with the information of said charge card;

means for reading the encoded embossments of said charge card, said means disposed in said aperture and adapted to engage the bottom surface of said charge slip in the area of imprint thereof by said charge card to read the encoded embossed projections thereof;

means for checking the validity of said encoded information as read by said reading means; and means operable in response to said checking means to indicate whether said charge card is valid or void, such checking taking place simultaneously with the imprinting of the information of said charge card onto said charge slip to provide a rapid and convenient validity check of every charge card each time it is used for a transaction.

2. The device as set forth in claim 1 wherein said means for impressing the information of said charge card onto said charge slip and associated said reading means comprises a pair of spaced apart longitudinally extending guide grooves disposed on both sides of said slot and extending therealong, a pair of associated tracks disposed vertically downwardly from each of said grooves, a bracket member of a generally inverted U-shape having a substantially horizontal base portion which tranverses the distance between said grooves and which terminates in a pair of substantially vertically downwardly projecting leg portions each associated with one of said grooves and passing therethrough and adapted to be guided by said groove for reciprocal longitudinal movement therealong relative to said slot, each leg portion terminating in a terminal edge having roller means associated therewith and adapted to engage said tracks when said bracket is depressed downwardly of said horizontal surface, and an elongated cylindrical resilient roller mounted intermediate said leg portions for rotation relative thereto about its axis with the circumference of said roller adapted to engage said horizontal surface as it is rolled back and forth thereacross, said roller engaging said credit card and said charge slip when resting on said platform and depressing said platform until said charge slip is resting on said reading means after which said credit card is further depressed by said roller to simultaneously imprint said credit card encoded embossments on the charge slip while energizing said reading means to read said encoded embossments from the associated projections thereof as formed in the bottom surface of said charge slip as said credit card is pressed thereonto.

3. The device as set forth in claim 2 wherein said reading means comprises a reader head having a multiplicity of embossment detection pins projecting upwardly from the top surface thereof and adapted to read the embossments as imprinted on the bottom surface of said charge slip as aforedescribed, and a reader assembly receiving electrical signals from said activated ones of said embossment detection pins to interpret the same and provide an output signal representing the same.

4. The device as set forth in claim 3 wherein said means for checking the validity of the information read by said reading means comprises a memory bank adapted to retain therein a multiplicity of information as to void credit cards, an encoder device having a plurality of push buttons adapted to be operated in a manner to insert respective ones of void credit card numbers into said memory bank for retention therein, and a comparison unit adapted to receive the output signal from said reader means and compare such signal with an output signal received from said memory bank to determine if the credit card information being read by said reader means is indicative of a void or valid credit card, said comparison unit providing an output signal designating a valid credit card if no comparison is made of the information read with the information in the memory bank, said comparison unit providing a void indicating output signal if the information from said reader means compares with said memory bank information, said valid and void output signals adapted to energize associated valid and void indicating means on said housing to simultaneously indicate to a user of the device whether the credit card is valid or void upon the imprinting of the transaction charge slip.

5. The device as set forth in claim 4 wherein said housing is provided with a back panel hinged to the housing for selective access to the interior components of the device, said panel provided with a lock to assure only authorized entrance into the device, and said pushbutton assembly of said encoder being disposed inwardly of said panel to provide ease of access thereto upon opening said panel for maintaining said memory bank in a continuously updated condition as to the entry of all void credit card numbers thereinto.

* * * * *